United States Patent
Tafarrodi et al.

(10) Patent No.: US 8,768,299 B2
(45) Date of Patent: Jul. 1, 2014

(54) SYSTEMS AND METHODS FOR AUTOMATIC USER-ENABLED ACCOUNT IDENTIFIER ASSOCIATION

(75) Inventors: Dar T. Tafarrodi, Roseville, CA (US); Chris Perry, Folsom, CA (US)

(73) Assignee: Cellco Partnership, Basking Ridge, NJ (US)

( * ) Notice: Subject to any disclaimer, the term of this patent is extended or adjusted under 35 U.S.C. 154(b) by 486 days.

(21) Appl. No.: 12/467,680

(22) Filed: May 18, 2009

(65) Prior Publication Data

US 2010/0291912 A1    Nov. 18, 2010

(51) Int. Cl.
*H04M 11/00* (2006.01)
*H04M 3/00* (2006.01)

(52) U.S. Cl.
USPC ......... 455/408; 455/414.1; 455/418; 455/410

(58) Field of Classification Search
CPC ....... H04W 12/06; H04W 4/24; H04W 8/265; H04W 88/02; H04W 12/08
USPC .......... 455/418, 419, 406–408, 435.1, 414.1, 455/411, 432.3; 379/114.15–114.2, 114.28, 379/114.29
See application file for complete search history.

(56) References Cited

U.S. PATENT DOCUMENTS

| | | | |
|---|---|---|---|
| 4,958,368 A * | 9/1990 | Parker | 379/91.01 |
| 5,887,249 A * | 3/1999 | Schmid | 455/411 |
| 6,549,770 B1 | 4/2003 | Marran | |
| 6,587,684 B1 | 7/2003 | Hsu et al. | |
| 6,819,916 B1 * | 11/2004 | Griffith et al. | 455/410 |
| 7,200,390 B1 | 4/2007 | Henager et al. | |
| 2002/0094808 A1* | 7/2002 | Tiedemann et al. | 455/419 |
| 2004/0242209 A1* | 12/2004 | Kruis et al. | 455/414.1 |
| 2005/0089151 A1 | 4/2005 | Han | 379/114.27 |
| 2005/0108126 A1* | 5/2005 | Cai et al. | 705/35 |
| 2006/0030315 A1* | 2/2006 | Smith et al. | 455/432.3 |
| 2006/0035631 A1* | 2/2006 | White et al. | 455/418 |
| 2006/0293036 A1* | 12/2006 | Zhou | 455/415 |
| 2007/0149178 A1* | 6/2007 | Thorson et al. | 455/414.1 |
| 2009/0037207 A1* | 2/2009 | Farah | 705/1 |

OTHER PUBLICATIONS

U.S. Cellular Activation Guide-How to activate your U.S. Cellular cell phone by JustCellular, Apr. 30, 2009. 2009.*

* cited by examiner

*Primary Examiner* — Daniel Lai

(57) ABSTRACT

Systems, methods, and an article of manufacturing for automatically associating an identifier of a particular mobile station with a mobile communications network account are shown and described. In some circumstances, an identifier is automatically captured from a mobile station, e.g., via over-the-air signaling to the network. Upon verification of other account details, the captured identifier is assigned to the account, e.g., with a particular directory number of the account, and the change is propagated to other systems of the mobile communications network.

26 Claims, 5 Drawing Sheets

SYSTEMS AND METHODS FOR AUTOMATIC USER-ENABLED ACCOUNT IDENTIFIER ASSOCIATION

TECHNICAL FIELD

The present subject matter relates to techniques and equipment associated with wireless communications systems. In more detail, the present disclosure relates to user-enabled association of an identifier with a mobile communications system account.

BACKGROUND

In existing mobile communication systems, when a user purchases a new mobile station it needs to be associated with their account. Various methods exist for making this association. For example, the user can call customer service and interact with a customer service representative to affect the change in mobile station and associate a new mobile station identifier with their account. As part of that process, the end-user is asked to inform the customer service representative of an electronic serial number (ESN) that was assigned to the new mobile station.

An ESN is typically 32 bits long. It consists of three fields, including an 8-bit manufacturer code, an 18-bit unique serial number, and 6 bits that were reserved for later use, although in practice these 6 bits have long been combined into a 24-bit serial number field.

ESNs are often represented as 11 digit decimal numbers or 8 digit hex numbers. The first three digits are the decimal representation of the first 8 bits (between 000 and 255 inclusive) and the next 8 are derived from the remaining 24 bits and will be between 00000000 and 16777215 inclusive.

Given the complexities of ESN numbers, the end-user can often make a mistake when repeating the alphanumeric characters of the ESN to the customer service representative. These errors can prevent the new mobile station from being associated with the user's account.

In addition to end-user errors, the customer service representative can easily input an incorrect alphanumeric digit of the ESN during the activation process. Again, an error in the ESN number prevents association of the new mobile station with the end-user's account. This can cause great frustration to the account holder.

Another method of associating a new mobile station with the end-user's account includes using a web interface provided by the mobile carrier. For example, the end-user can sign into their account online and update which mobile station is associated with their account by inputting the ESN associated with the new mobile station. Again, as part of this process, the end-user is required to input the ESN number associated with the new mobile station. Given the complexity of these numbers, this process is prone to errors. Inputting the wrong ESN prevents the carrier from correctly associating the new mobile station with the end-user's account. Again, the account holder may become frustrated with the activation process and seek a new mobile carrier.

Hence a need exists for systems and methods that provide a means for the end-user to accurately and automatically associate a new mobile station identifier with their mobile carrier account.

SUMMARY

The teachings herein alleviate one or more of the needs discussed above relating to capture or entry of a mobile station identifier. The systems, methods, and articles of manufacture described herein provide for automatic capture of the new mobile station identifier and association of that identifier with an account without interaction from a customer service representative.

In one configuration, a method of automatically associating an identifier of a particular mobile station with a mobile communications network account is shown and described. The method can include receiving an initiation request from the mobile station over the air in the mobile communication network and automatically capturing from the mobile station the mobile station identifier. The method also includes validating one or more account parameters associated with the mobile communications network account and associating the captured mobile station identifier with the mobile communications network account upon successful validation.

In certain examples, automatically capturing includes automatically capturing from the mobile station an electronic serial number associated with the mobile station. It can also include updating another mobile communications network element with the captured mobile station identifier associated with the mobile communications network account. The updating and validating can be performed by the same or different network elements (e.g., a customer care enterprise services platform).

In further examples, the method includes provisioning the mobile station with account specific information upon successful validation. Provisioning can include associating a mobile directory number ("MDN") with the mobile station. Provisioning can also include associating a mobile identification number ("MIN") with the mobile station.

In another configuration, a mobile communications network is shown and described. The mobile communications network includes a traffic network configured to support communications and one or more mobile communications network elements in communication with the traffic network. The one or more mobile communications network elements are configured to receive an initiation request from a mobile station over the air in the mobile communications network and automatically capture a mobile station identifier, responsive to the received initiation request. The network elements also validate one or more account parameters associated with the mobile communications network account and associate the captured mobile station identifier with the mobile communications network account upon successful validation to activate the particular mobile station for mobile communication network service on the account.

In yet another configuration, an article of manufacture is shown and described. The article includes a machine readable storage medium and executable program instructions embodied in the machine readable storage medium that when executed by a programmable system coupled to a mobile communications network causes the system to perform functions that change an identifier of a particular mobile station that is associated with a mobile communications network account. The functions include receiving an initiation request from the mobile station over the air in the mobile communication network and automatically capturing from the mobile station the mobile station identifier, responsive to the received initiation request. The functions also include validating one or more account parameters associated with the mobile communications network account and associating the captured mobile station identifier with the mobile communications network account upon successful validation, to activate the particular mobile station for mobile communication network service on the account.

As a result, the systems, methods, and articles of manufacture described herein provide for automatic capture of the new identifier and association of that identifier with an account without interaction from a customer service representative Other concepts relate to unique software for implementing the automatic association of an identifier of a particular mobile station with a mobile communications network account. A software product, in accord with this concept, includes at least one machine-readable medium and information carried by the medium. The information carried by the medium may be executable program code, one or more databases and/or information regarding the automatic association of an identifier of a particular mobile station with a mobile communications network account.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various systems, methods, and articles of manufacture disclosed herein relate to automatically capturing a new identifier of a mobile station and associating that identifier with an account, without requiring interaction from a customer service representative. Said another way, the systems, methods, and articles of manufacture described herein allow for the changing the mobile station that is associated with the end-user's account by changing the ESN that is associated with the directory number of end-user. The change in identifier is also propagated throughout the mobile communications system. In some instances, the described examples are most readily understood in the context of a pre-paid wireless communication system, but they can apply equally to a post-paid system. For example, if an end-user purchases a mobile station from a secondary market (e.g., the want adds or a friend) the end-user can associate that new mobile station with their account without interaction from customer service.

Figure 1:
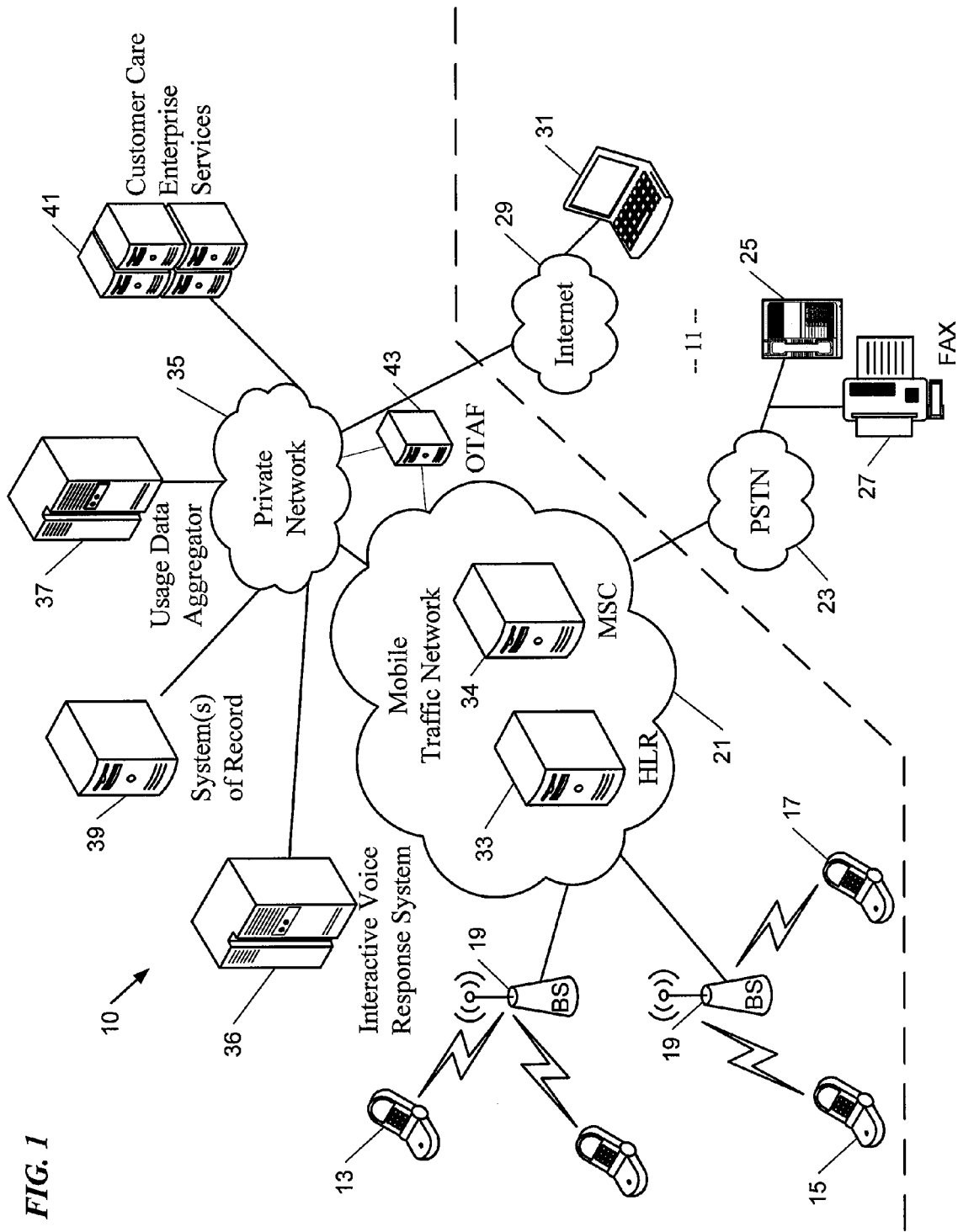
FIG. 1 is a functional block diagram useful in understanding networked elements/systems that may be used in automatically associating an identifier with an end-user's account.

Reference now is made in detail to the examples illustrated in the accompanying drawings and discussed below. FIG. 1 illustrates a number of mobile stations, a mobile communication network coupled to other communication networks and several systems/elements associated with or included in the mobile network for various functions as may be involved in automatically associating an identifier of a particular mobile station with a mobile communications network account.

Hence, FIG. 1 illustrates a mobile communication network 10 as may be operated by a carrier or service provider to provide a wide range of mobile communication services and ancillary services or features to its subscriber customers and associated mobile station (MS) users. The elements generally indicated by the reference numeral 10 generally are elements of the network and are operated by or on behalf of the carrier, although the mobile stations typically are sold to the carrier's customers. The mobile communication network 10 provides communications between mobile stations as well as communications for the mobile stations with networks and stations 11 outside the mobile communication network 10.

For purposes of later discussion, several mobile stations 13, 15, and 17 appear in the drawing, to represent examples of the mobile stations that may receive various services via the mobile communication network 10. Today, mobile stations typically take the form portable handsets, smart-phones or personal digital assistants, although they may be implemented in other form factors. For discussion of the automatically associating an identifier of a particular mobile station with a mobile communications network account, we will assume that the mobile stations 13, 15 and 17 and are each associated with an individual subscriber account.

The network 10 allows users of the mobile stations to initiate and receive telephone calls to each other as well as through the public switched telephone network (PSTN) and telephone stations connected thereto. The network 10 allows SMS, EMS, and MMS type messaging between mobile stations and similar messaging with other devices via the Internet. The network 10 typically offers a variety of other data services via the Internet, such as downloads, web browsing, e-mail, etc.

The mobile communication network 10 typically is implemented by a number of interconnected networks. Hence, the overall network 10 may include a number of radio access networks (RANs), as well as regional ground networks interconnecting a number of RANs and a wide area network (WAN) interconnecting the regional ground networks to core network elements, such as the MMSCs. A regional portion of the network 10, such as that serving mobile stations 13, 15 and 17, will typically include one or more RANs and a regional circuit and/or packet switched network and associated signaling network facilities.

Physical elements of a RAN operated by one of the mobile service providers or carriers, include a number of base stations represented in the example by the base stations (BSs)

19. Although not separately shown, such a base station 19 typically comprises a base transceiver system (BTS) which communicates via an antennae system at the site of base station and over the airlink with one or more of the mobile stations 13, 15 and 17, when the mobile stations are within range. Each base station typically includes a BTS coupled to several antennae mounted on a radio tower within a coverage area often referred to as a "cell." The BTS is the part of the radio network that sends and receives RF signals to/from the mobile stations that the base station currently serves.

The radio access networks also include a traffic network represented generally by the cloud at 21, which carries the user communications for the mobile stations 13, 15 and 17 between the base stations and other elements with or through which the mobile stations communicate. The traffic network can include one or more home location register(s) (HLRs) 33 and mobile switching centers (MSCs) 34 in communication with the various other traffic network elements. Each time a call is placed, the ESN is automatically transmitted to the base station 19 so the wireless carrier's mobile switching center 34 can check the call's validity. During operation, the MSC 34 can save the ESN for use by other elements of the network 10. Other individual elements such as switches and/or routers forming the traffic network 21 are omitted here form simplicity.

The HLR 33, in some examples, stores a subscriber profile for each of the wireless subscribers and their associated mobile station 13, 15, and 17. The HLR 33 may reside in an MSC 33 or in a centralized service control point that communicates with the MSC(s) 34 via an out-of-band signaling system such as an SS7 network. The HLR 33 stores for each mobile subscriber the subscriber's mobile telephone number, the mobile identification number, and information specifying the wireless services subscribed to by the mobile subscriber, such as numeric paging or text-based paging, data communication services, etc.

The mobile communication network 10 also includes an interactive voice response system ("IVR") 36, that communicates with the other network elements using the various networks shown and described. The IVR system 36 allows a computer to detect voice and keypad inputs from devices such as the mobile station or the subscribers voice. IVR system 36 can respond with pre-recorded or dynamically generated audio to further direct users on how to proceed. IVR system 36 can be used to control almost any function where the interface can be broken down into a series of simple menu choices. In some situations, the IVR system 36 uses DTMF signals (entered from the telephone keypad) and natural language speech recognition interpret the caller's response to voice prompts. Various features of the present disclosure can be implemented using the IVR system 36 and are discussed below in more detail.

A Mobile Directory Number (MDN) is the telephone number assigned to a mobile station, which a calling party or device inputs in order to call or send a message to the particular mobile station. To call the mobile station 15, for example, a user of a PSTN telephone or of another mobile station dials the MDN associated with the mobile station 15. To send a MMS message or a SMS message to destination mobile station 15, as another example, typically entails input of the MDN of that mobile station. A Mobile Identification Number (MIN) is an identification number used by the network 10 to signal a particular mobile station. The MIN is formatted like a telephone number, and the MIN may be the same as the MDN. However, increasingly, the network assigns a different number for use as the MIN and translates the MDN input by a calling or other originating party into the MIN that the network 10 uses to establish the call or send the message to the destination mobile station. Of these numbers assigned to the mobile station, the MDN typically is the number or address of the station known and used by other parties or stations and corresponding to the applicable subscriber account with the mobile service provider.

The traffic network portion 21 of the mobile communication network 10 connects to a public switched telephone network 23. This allows the network 10 to provide voice grade call connections between mobile stations and regular telephones connected to the PSTN 23. The drawing shows one such telephone at 25. The PSTN 23 also provides connections to other types of customer premises equipment, such as facsimile or 'FAX' machines. The drawing shows one FAX machine 27.

The traffic network portion 21 of the mobile communication network 10 connects to a public packet switched data communication network, such as the network commonly referred to as the "Internet" shown at 29. Packet switched communications via the traffic network 21 and the Internet 29 may support a variety of user services through the network 10, such as mobile station communications of text and multimedia messages, e-mail, web surfing or browsing, programming and media downloading, etc. For example, the mobile stations may be able to receive messages from and send messages to user terminal devices, such as personal computers, either directly (peer-to-peer) or via various servers (not separately shown). The drawing shows one such user terminal device as a personal computer (PC) at 31, by way of example.

The carrier will also operate a number of systems that provide ancillary functions in support of the communications services provided through the network 10, and those elements communicate with other nodes/elements of the network 10 via one or more private IP type packet data networks 35 (sometimes referred to as an Intranet). The support elements, for example, include one or more systems of record, such as the system shown at 39. An example of such a system 39 is a Vision system, which includes subscriber account records. A large carrier typically has a number of such systems, and the system that stores the account data for a particular subscriber may be referred to as the "system of record" for that subscriber's account.

Another ancillary carrier system of the network 10 is a usage data aggregator 37. The usage data aggregator 37 will monitor real time usage of the mobile stations 13, 15, and 17 through the mobile traffic network 21. The aggregator 37 may be similar to real-time call or usage rating platform originally developed for prepaid services. Such a platform, however, may be adapted to usage monitoring for postpay subscription services as well, for example, where it is desirable to monitor and possibly restrict amount of usage or other aspect of mobile station operations in real-time. An example of a suitable platform, which may be adapted to perform the functions of the usage data aggregator 37, is the Surepay® platform manufactured and sold by Alcatel-Lucent.

The exemplary network 10 also includes a customer care enterprise services ("CCES") system 41, which is coupled for communication via the private network 35. These systems include one or more billing systems, network provisioning systems such as the Mobile Telephone Administration System or "MTAS", client account administration systems, and the like. The billing system, for example, receives usage and operations data from the usage data aggregator 37 and processes that data to generate bills for individual subscriber and to forward data regarding users roaming through the carrier's service area through a clearinghouse (not shown) for reconciliation. The MTAS provides data to the HLR 33 and/or to the MSCs 34 to provision services for mobile stations 13, 15, and 17 and modifies provisioning data as customers automatically associate an identifier of their particular mobile station with their mobile communications network account. In some instances, MTAS receives the ESN captured by the MSC 34 during call initiation. Recall that when a call is placed, the ESN is automatically transmitted to the base station 19 so the wireless carrier's mobile switching center 34 can check the call's validity. MTAS can determine if the ESN is already active within the network 10.

The exemplary network 10 also includes an automated Over-the-Air Service Activation/Provisioning Function (OTAF) 43. The OTAF 43 platform, for example, has a link for voice calls to one or more of the MSC switches 34 and for signaling communications through the mobile communication network. In a typical service activation or provisioning call, a user of the mobile station 15 dials a number assigned for calls to the OTAF platform 43, e.g. *22888 or *22898, and the MSC completes the call to the platform 43, which responds with an announcement or prompt by way of the IVR 36. During this initial step, the mobile station 15 transmits its assigned ESN number to the base station 19 over the air. The ESN is communicated from the BS 19 to the MSC 34 and other elements of the network to confirm the validity of the call. The OTAF platform 43 may also ask the user to key in one or more additional digits to select an appropriate option, e.g. 90 for new service activation of the mobile station or 91 for provisioning data update such as an ESN change. Upon completion of the call to the platform, and entry of additional digits if appropriate, the platform downloads the appropriate provisioning data into the mobile station 15. The communication of the provisioning data typically uses signaling resources of the network, rather than the voice link, although the download could use the voice channel.

As part of its operations, the OTAF platform 43 receives data from one or more of the system of record 39, the customer care enterprise services 41 platform, the IVR system 36, and the Usage Data Aggregator 37, from example, via the carrier's private IP network 35. For activation of mobile service, for example, one or more of the network components will advise the OTAF platform 43 of the MIN and the MDN assigned to the mobile station 15 through the wireless network 10.

With that overview of the system, it may be helpful now to consider a high-level discussion of an example of how a mobile communication network subscriber (also referred to as an end-user) automatically associates an identifier of their mobile station with their mobile communications network account.

For purposes of this example, assume the end-user of the mobile station 15 desires to change a mobile station, and thus an identifier (e.g., an ESN, an IMEI, or an MEID), associated with their wireless account. Instead of calling customer service and reading the ESN to the representative, which can lead to errors, or accessing their account via a web interface and keying in the new ESN, which can also lead to errors, the end-user dials a specific code (e.g., *22898). The code is resolved by one of the network elements (e.g., the MSC 34) which establishes communications with the mobile station 15 and captures the ESN transmitted by the mobile station 15 during initiation of the call without requiring end-user input of the mobile station identifier. The IVR system 36 prompts the end-user to select an option from a list of one or more options. For example, the IVR system 36 instructs the end-user to select the ESN change option by providing a specific response (e.g., depressing the nine key on their keypad).

Once the ESN change selection is received, the IVR system 36 prompts the end-user to input their MDN for account identification purposes. The received MDN is compared against a list of known MDNs resident on one or more of the network elements (e.g. HLR 33, CCES 41, or System of Record 39). If the MDN is found to exist, the IVR prompts to the end-user to input their account security code (ASC). The received ASC is checked for correctness by one or more of the network elements (e.g., MSC 34 and/or, HLR 33, CCES 41, or System of Record 39). Upon successful resolution of the ASC, the ESN, which was captured during the call by one or more of the network elements (e.g., MSC 34, HLR 33, CCES 41, or System of Record 39) is associated with the account of the end-user. The initial association of the new identifier can occur in eCARS, which is executing on CCES 41. The OTAF platform 43 provisions the mobile station 15 with the required information, and the ESN change is propagated throughout the other platforms and systems of the wireless communications network 10. For example, eCARS can propagate the change to the other systems and platforms (e.g., the Vision system of the system of record 39, the usage data aggregator 37, and others) of the network 10 to ensure that the change is recorded throughout the network 10.

Figure 2:
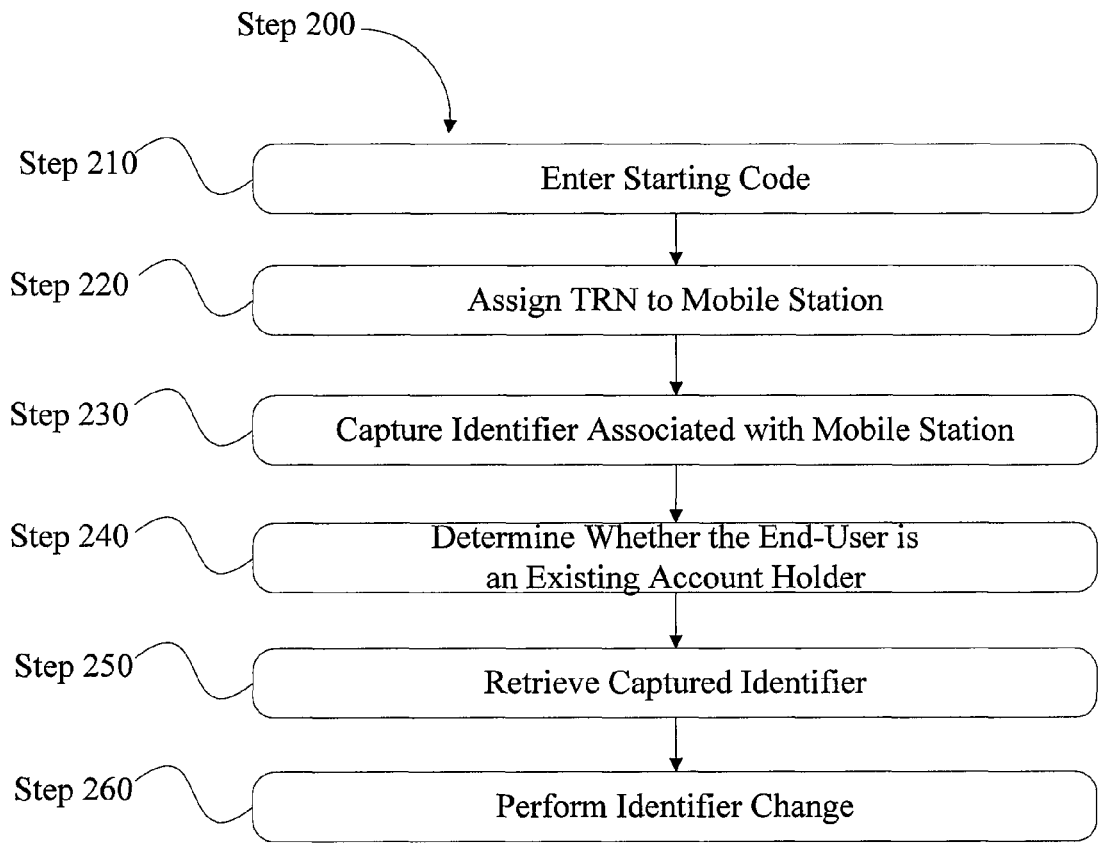
FIG. 2 is a high-level flow chart illustrating a process for automatic end-user enabled account identifier association.

With reference to FIG. 2, an example of a method 200 for automatically associating an identifier of a mobile station 15 with an account of the end-user is shown and described. The method 200 includes receiving (step 210) a starting code from a mobile station 15. For example, the starting code can be a "star" or "pound" code such as *22888 or *22898. The OTAF platform 43 receive the code and establishing, based on the received code, a session with the IVR system 36 and the mobile station 15. The IVR system 36 assigns (step 220) a temporary routing number (TRN) to the mobile station 15. The TRN acts as an interim MIN for the mobile station 15. This TRN is needed because the received code indicates to certain elements of the mobile communications network 10 that mobile station 15 does not have a MIN registered within the network 10. Said another way, the received code indicates the mobile station 15 should not be active on the mobile network 15. The TRN allows the elements of the network to communicate with the mobile station 15 during the identifier change process.

The method 200 also includes automatically capturing (step 230) an identifier (e.g., the ESN) associated with the mobile station 15. During the call initiation, one of the network elements captures the identifier associated with the mobile station 15. For example, the MTAS functionality described above can capture the ESN associated with mobile station 15. The captured identifier is stored for further use during the method 200. In another example, the ESN is automatically transmitted over the air from the mobile station 15 to the base station 19, which in turn passes the ESN to the MSC 34 to check the call's validity. The MSC 34 stores the ESN and communicates the captured ESN to one or more network elements (e.g., MTAS) as needed. The ESN and TRN are linked much like an ESN/MIN pair is often used within the network. As stated above, the new mobile station does not have a MIN because it is not active on the network and thus the TRN is used by the network to communicate with the new mobile station 15.

The method 200 also determines (step 240) whether the end-user of the mobile station 15 has an existing account within the mobile communications network 10. The IVR system 36 communicates with the mobile station 15 using the TRN and the ESN and prompts the end-user thereof for specific input. For example, the IVR system 36 prompts the end-user to indicate using the keypad of the mobile station 15 whether they are an existing customer or not. For example, an input of "1" can indicate the end-user of the mobile station 15 is an existing user. Of course, other inputs, such as keying in the user's address, account number, name, zip code, or other personal identifier that can be resolved by one or more of the network elements can be used.

The method also includes retrieving (step 250) the captured identifier stored within the network 10. The IVR system 36 asks for confirmation from the end-user of the mobile station that they wish to change the mobile station identifier associated with their account. Upon confirmation that the change should be processed, the CCES platform 41 receives or retrieves the TRN from the IVR system 36 and communicates it to MTAS. In response, the automatically captured ESN number is returned to the CCES platform 41, which communicates it to the IVR system 36. The automatically captured ESN is also validated by confirming the that the ESN not already active on the network 10 or is not associated with carrier operating the network 10. This is accomplished by checking a store (not shown) that lists active ESNs.

The method 200 includes changing (step 260) the mobile station identifier associated with the end-user's account. As described in further detail below, various steps and actions are performed by one or more of the network elements in order to complete the change request. In one example, the end-user is prompted to verify they are the account holder for which the change is being processed by responding to various challenge requests from the IVR system 36. After confirming the end-user is the account holder, the identifier for the account is changed, the change is propagated throughout the network 10, and the mobile station 15 is provisioned with the updated information.

Figure 3:
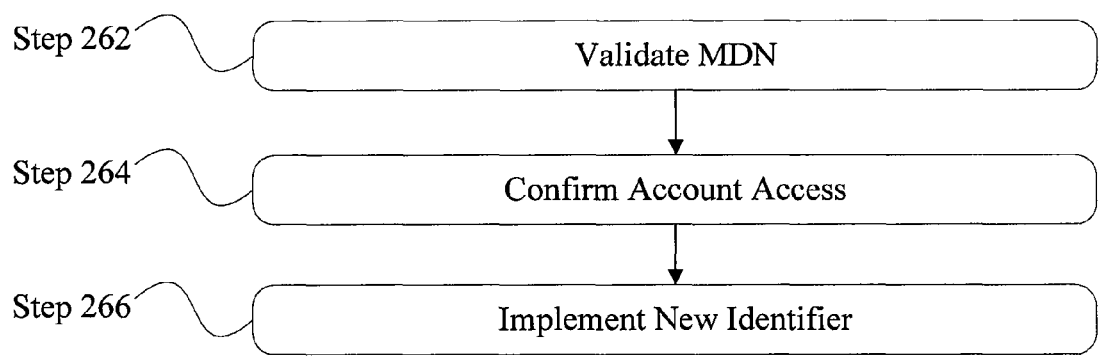
FIG. 3 is a more detailed flow chart illustrating a process for changing an identifier associated with a mobile user's account.

With reference to FIG. 3, various steps and actions associated with automatically changing (step 260) the mobile station identifier associated with the end-user's network account are shown and described. In one example, one or more components of the network 10 validates (step 262) a received MDN. The IVR system 36 prompts the end-user to input the MDN associated with their account. The received MDN is processed and validated by one or more network components 10. Further details of the MDN validation are described with reference to FIG. 4.

In addition, changing (step 260) the mobile station identifier associate with the use's account includes confirming (step 264) account access for the end-user. After confirming the received MDN is valid, the IVR system 36 prompts the end-user to input their account security code (ASC). The ASC can take various forms such as a specific alpha-numeric code. The received ASC is validated using one or more components of the network 10. Further details of the ASC validation described below with respect to FIG. 5.

Another action involved in changing (step 260) the identifier associated with the end-user's network account includes implementing (step 266) the new identifier (i.e., the mobile station identifier that was automatically captured during call initiation). After the MDN and ASC are validated by the network elements, the captured identifier is associated with the end-user's account for future use. The change is propagated to each of the network elements that uses the ESN to perform various functionality. Further, the mobile station 15 is provisioned by the OTAF system 43 using the new information. Additional details of implementing (step 266) the identifier are described below with reference to FIG. 6.

Figure 4:
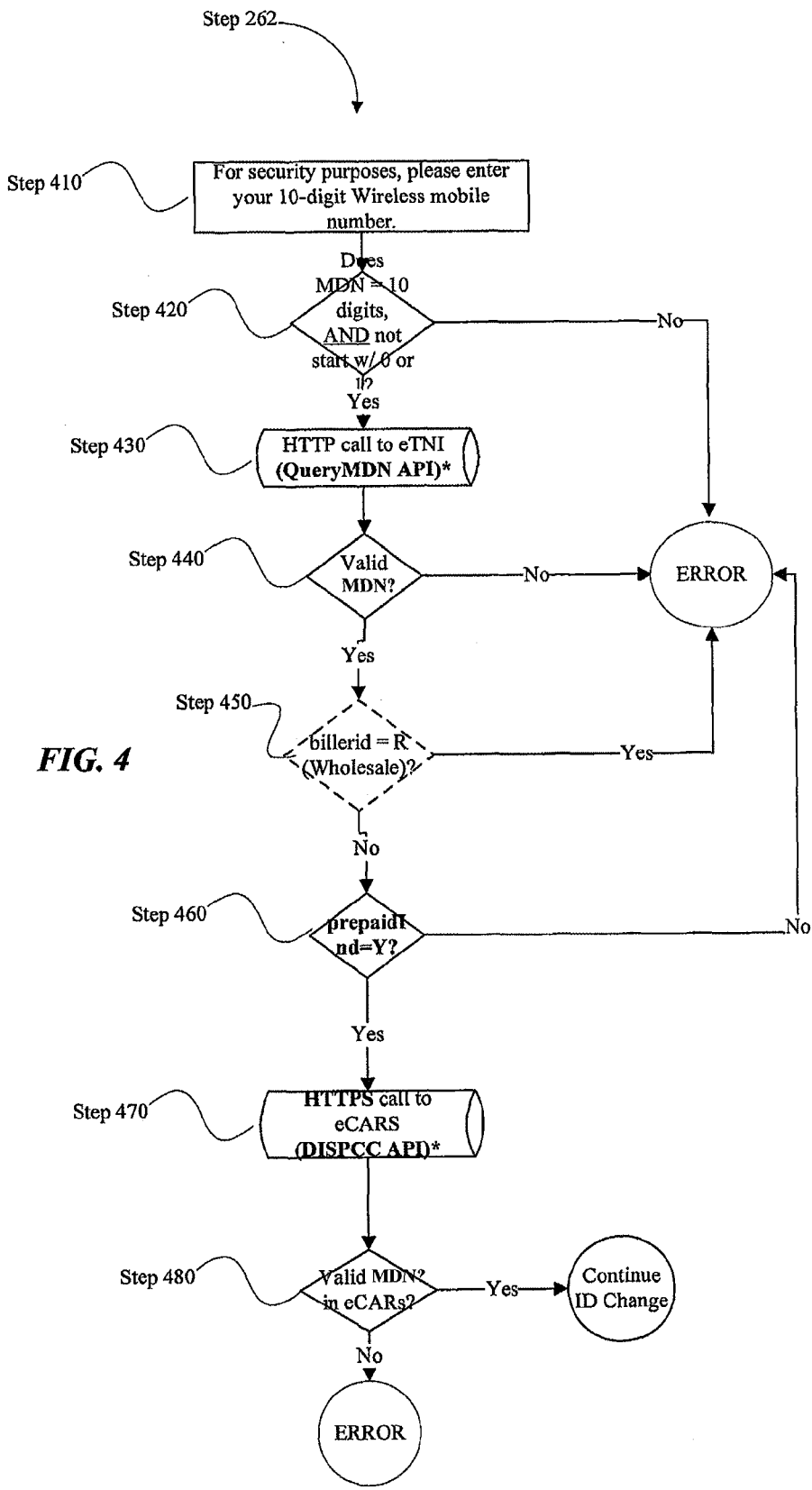
FIG. 4 is a more detailed flow chart illustrating a process for validating an MDN.

With reference to FIG. 4, further details of validating (step 262) the MDN of the end-user are shown and described. In one example, the IVR system 36 prompts (step 410) the end-user to enter their MDN using the keypad of the mobile station 15. After entry, the IVR confirms (step 420) that the correct number of digits was entered. If the correct number of digits was not received, the IVR system 36 plays an error message. When the correct number of digits was received, the IVR system 36 makes an API call (step 430) to another application (e.g., an electronic Telephone Number Inventory (eTNI)) executing within the network 10. The API call can be transmitted using the HTTP protocol or any other protocol supported by the network 10. Included in the API call is the MDN and additional information such as the date, time, the user's id and a biller id. The called application returns an XML based message that includes information such as the following: MDN, biller Id, product type, MDN status, last transaction, last transaction date, user id, number location, number group, hold reason, rate center, rate center state, port indicator, LRN postpaid, LRN prepaid, SID (of min), number location description, number group description, port status, port direction, and prepaid indicator.

The IVR system 36 uses the received XML information and determines (step 440) whether the MDN is valid. If the MDN is not valid, an error message is played. If the MDN is valid, the IVR system 36 optionally determines (step 450) whether the received biller id indicates that the biller id is associated with a wholesale billing system. If it is, then an error message is played by the IVR system 36. If the biller id is not associated with a wholesale billing system, the IVR system 36 determines (step 460) whether the MDN is a prepaid MDN using the received XML response. If the MDN is not a prepaid MDN, then the IVR system 36 plays an error message. When the MDN is a prepaid MDN, another (i.e., a second) API call is made by the IVR system 36. However, it should be understood that the teachings described herein are equally applicable to post-paid systems.

The second API call can occur using a secure HTTP request to an electronic card activation and retention system (eCARS) application executing within the network 10. The eCARS application can execute on the CCES platform 41 or another network element (e.g., HLR 33, system of record 39, MSC 34). The eCARS application can include functionality to confirm an end-user's ability to pay for services among other functionality. For example, one element can be functionality to determine whether a valid credit card number is on file for the end-user. If there is a valid credit card on file, the MDN is likely valid. The response received from the second API call includes an indication as to whether there is a valid credit card on file. In addition, the returned message can include an indication of an account security code associated with the MDN. The returned ASC is used by other applications of the network 10 as described in more detail below with reference to FIG. 5. The returned response can be formatted using XML or another suitable message format.

The IVR system 36 determines (step 480) whether the MDN is valid in eCARS (i.e., there is a payment method, such as a credit card, on file in the eCARS system) using the returned response from the second API call. If the MDN is not valid, an error message is played. If the MDN is valid, further account validation occurs. As shown in FIG. 3, the IVR system 36 confirms the end-user has access to the account associated with the MDN.

Figures 5, 6:
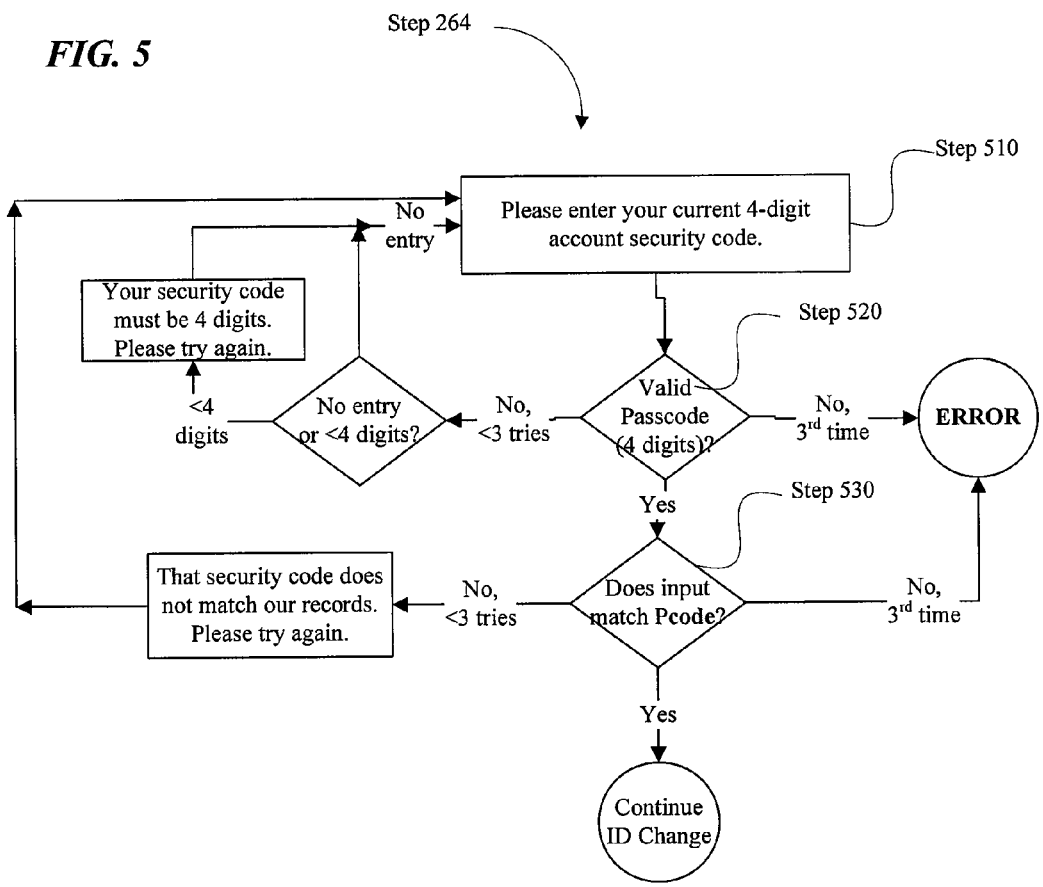
FIG. 5 is a more detailed flow chart illustrating a process for confirming account access.
FIG. 6 is a more detailed flow chart illustrating a process for implementing the new identifier.

With reference to FIG. 5, further details of confirming (step 264) account access are shown and described. After the MDN is validated, the IVR system 36 prompts (step 510) the end-user to enter an account security code (ASC). The security code can be four digits although greater or fewer digits can be used. The IVR system 36 confirms (step 520) that the correct number of digits were received for the ASC. When the incorrect number of digits are received, an error message is played.

If the correct number of digits were received, the actual digits are compared to the ASC received from the second function call described above with reference to FIG. 5. If the received ASC code does not match that received from the second function call, an error message is played and another attempt to input the correct code can be made. If the correct ASC was entered, the mobile station identifier (e.g., ESN) change continues.

With reference to FIG. 6, further details of changing (step 266) the identifier are shown and described. After the MDN and ASC are validated, the automatically captured ESN is associated with end-user's mobile account. This new ESN can replace an already existing ESN associated with the account. The new ESN is also updated (step 610) with other elements of the mobile network 10. For example, the system of record 39, the usage data aggregator 37, the OTAF 43, the customer care enterprise services, the MCS 34, the HLR 33, and any other application or device that uses the ESN of the mobile station is also updated. The updates can occur using any type of signaling supported by the mobile network 10 (e.g., http, https, SMS, xml, and the like).

In addition to updating the network elements with the new ESN, the OTAF 43 provisions (step 620) the mobile station 15. Provisioning the mobile station 15 occurs automatically over-the-air. Details of provisioning mobile station can be found in commonly owned U.S. Pat. No. 6,587,684 by Hsu et al. issued on Jul. 1, 2003, the entire contents of which are incorporated herein by reference.

Figures 7, 8:
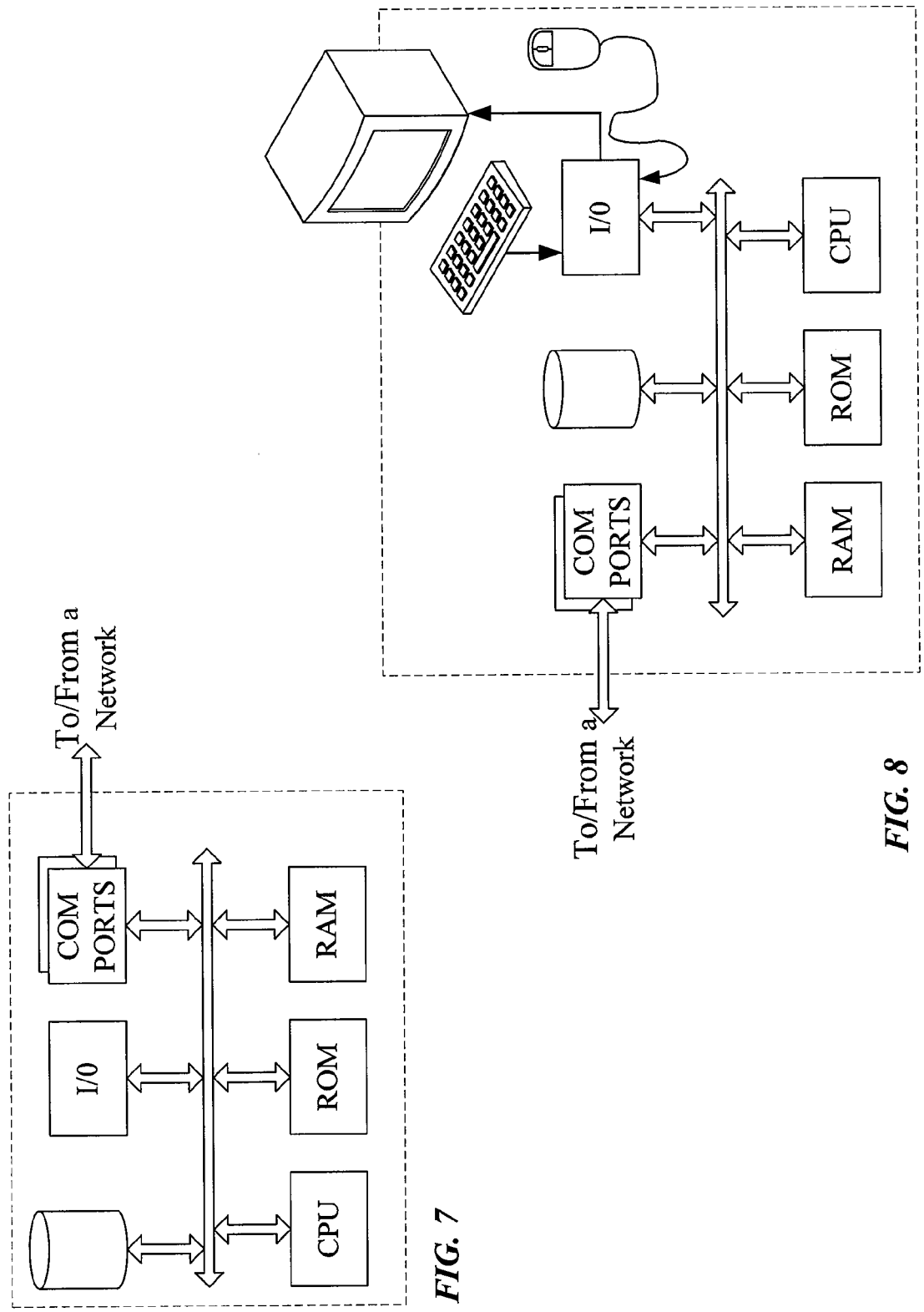
FIG. 7 is a simplified functional block diagram of a computer that may be configured as a host or server.
FIG. 8 is a simplified functional block diagram of a personal computer or other work station or terminal device.

FIGS. 7 and 8 provide functional block diagram illustrations of general purpose computer hardware platforms, which may be used as the hardware platform(s) for one or more of the network elements (e.g., IVR 36, HLR, 33, MSC, 34, OTAF 43, system of record 39, usage data aggregator 37, and/or CCES 41). FIG. 7 illustrates a network or host computer platform, as may typically be used to implement a server. FIG. 8 depicts a computer with user interface elements, as may be used to implement a personal computer (PC) or other type of work station or terminal device, although the computer of FIG. 8 may also act as a server if appropriately programmed. It is believed that those skilled in the art are familiar with the structure, programming and general operation of such computer equipment and as a result the drawings should be self-explanatory.

The hardware elements, operating systems and programming languages of such computers are conventional in nature, and it is presumed that those skilled in the art are adequately familiar therewith. Of course, the server functions may be implemented in a distributed fashion on a number of similar platforms, to distribute the processing load.

Hence, aspects of the methods of automatically associating an account identifier with a mobile user's account outlined above may be embodied in programming. Program aspects of the technology may be thought of as "products" or "articles of manufacture" typically in the form of executable code and/or associated data that is carried on or embodied in a type of machine readable medium. "Storage" type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software from one computer or processor into another, for example, from a management server or host computer of the network operator or carrier into the computer platform of the data aggregator and/or the computer platform (s) that serve as the customer communication system. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer (s) or the like, such as may be used to implement the data aggregator, the customer communication system, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementations described above utilized an ESN, other account identifiers may be used such as a Mobile Equipment ID (MEID), an International Mobile Equipment Identity number (IMEI), or a UIMID (User Identity Module Identifier).

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

APPENDIX: ACRONYM LIST

The description above has used a large number of acronyms to refer to various services, messages and system components. Although generally known, use of several of these acronyms is not strictly standardized in the art. For the convenience of the reader, the following list correlates terms to acronyms, as used in the detailed description above.

ESN: Electronic Serial Number
eCARS: Electronic Card Activation and Retention System eTNI: Electronic Telephone Number Inventory
MSC: Mobile Switching Center
OTAF: Over-the-Air Service Activation/Provisioning Function
IVR: Interactive Voice Response
CCES: Customer Care Enterprise System
SMSC: Short Message Service Center
OSI: Open Systems Interconnection
RAN: Radio Access Network
PSTN: Public Switched Telephone Network
SMS: Short Message Service
HLR: Home Location Register
VLR: Visitor Location Register
BTS: Base Transceiver System
MMSC: Multimedia Message Service Center
MTAS: Mobile Telephone Administration System
SMS: Short Messaging Service
MMS: Multimedia Messaging Service
EMS: Enhanced Messaging Service
WAN: Wide Area Network
DTMF: Dual-tone Multi-frequency
MIN: Mobile Identification Number
MDN: Mobile Directory Number
TRN: Temporary Routing Number
IP: Internet Protocol

What is claimed is:

1. A method comprising steps of:
receiving an initiation request from a mobile station to be activated over the air in a mobile communication network;
assigning a temporary routing number to the mobile station responsive to receiving the initiation request, wherein the temporary routing number is used for communicating with the mobile station through the mobile communication network prior to completion of activation of the mobile station on the mobile communication network;
automatically capturing from the mobile station, by a first mobile communications network element, a mobile station identifier, responsive to the received initiation request, wherein the step of automatically capturing comprises receiving the mobile station identifier from the mobile station without end-user input of the mobile station identifier;
validating, by a second mobile communications network element, one or more account parameters, the validating step including validating a mobile directory number by verifying that a method for payment of future services of the mobile station exists, wherein the mobile directory number is a telephone number to be associated with the mobile station;
after validating the mobile directory number by verifying that a method for payment of future services of the mobile station exists, validating an account security code to determine access to an existing mobile communications network account; and
upon successful validation of the mobile directory number and determining access to the existing mobile communications network account, associating the captured mobile station identifier with the existing mobile communications network account to activate the mobile station for mobile communication network service on the existing mobile communications network account.

2. The method of claim 1 wherein the step of automatically capturing comprises automatically capturing from the mobile station an electronic serial number associated with the mobile station.

3. The method of claim 1 further comprising updating a third mobile communications network element with the captured mobile station identifier associated with the mobile communications network account.

4. The method of claim 3, wherein the third mobile communications network element is a home location register (HLR) which is updated with the captured mobile station identifier upon activating the mobile station for mobile communication network service.

5. The method of claim 1 wherein capturing and validating are performed by the same mobile communications network element.

6. The method of claim 5 wherein the network element comprises a customer care enterprise services platform.

7. The method of claim 1 wherein capturing and validating are performed by different mobile communications network elements.

8. The method of claim 1 further comprising provisioning the mobile station with account specific information upon successful validation, wherein the provisioning uses the temporary routing number assigned to the mobile station to communicate with the mobile station through the mobile communication network.

9. The method of claim 8 wherein the provisioning comprises associating the mobile directory number with the mobile station.

10. The method of claim 9 wherein the provisioning further comprises associating a mobile identification number ("MIN") with the mobile station.

11. The method of claim 1 wherein associating the captured mobile station identifier comprises replacing an electronic serial number of the existing mobile station associated with the mobile communications network account with an electronic serial number captured from the mobile station becoming associated with the existing account.

12. The method of claim 1, wherein the mobile station identifier is one of: electronic serial number (ESN), a Mobile Equipment ID (MEID), an International Mobile Equipment Identity number (IMEI), or a UIMID (User Identity Module Identifier).

13. The method of claim 1, wherein the temporary routing number serves as a temporary mobile identification number ("MIN") while the mobile station does not have a MIN registered with the mobile communication network.

14. The method of claim 1, further comprising determining whether the captured mobile station identifier corresponds to the mobile station identifier that is already active on the mobile communication network.

15. A mobile communication network, comprising:
a traffic network configured to support communications; and
one or more mobile communications network elements in communication with the traffic network, the one or more mobile communications network elements configured to:
receive an initiation request from a mobile station to be activated over the air in the mobile communications network;
assign a temporary routing number to the mobile station responsive to receiving the initiation request, wherein the temporary routing number is used for communicating with the mobile station through the mobile communication network prior to completion of activation of the mobile station on the mobile communication network;
automatically capture a mobile station identifier, responsive to the received initiation request, wherein to automatically capture the mobile station identifier comprises receiving the mobile station identifier from the mobile station without end-user input of the mobile station identifier;

validate one or more account parameters, including to:
  validate a mobile directory number by verify that a method for payment of future services of the mobile station, wherein the mobile directory number is a telephone number to be associated with the mobile station; and after validating the mobile directory number by verifying that a method for payment of future services of the mobile station exists, validate an account security code to determine access to an existing mobile communications network account; and upon successful validation of the mobile directly number and determining access to the existing mobile communications network account, associate the captured mobile station identifier with the existing mobile communications network account to activate the mobile station for mobile communication network service on the existing mobile communications network account and replace the existing mobile station associated with mobile communications network account.

16. The mobile communications network of claim 15 wherein the mobile station identifier comprises an electronic serial number associated with the mobile station.

17. The mobile communications network of claim 15 wherein the one or more mobile communications network elements is further configured to update another communications network element with the captured mobile station identifier associated with the mobile communications network account.

18. The mobile communications network of claim 17, wherein the other communications network element is a home location register (HLR) which is updated with the captured mobile station identifier upon activating the mobile station for mobile communication network service.

19. The mobile communications network of claim 15 wherein capturing and validating are performed by the same mobile communications network element.

20. The mobile communications network of claim 19 wherein the network element comprises a customer care enterprise services platform.

21. The mobile communications network of claim 15 wherein capturing and validating are performed by different mobile communications network elements.

22. The mobile communications network of claim 15 wherein the one or more mobile communications network elements is further configured to provision the mobile station with account specific information upon successful validation, wherein the provisioning uses the temporary routing number assigned to the mobile station to communicate with the mobile station through the mobile communication network.

23. The mobile communications network of claim 22 wherein the provisioning comprises associating the mobile directory number with the mobile station.

24. The mobile communications network of claim 23 wherein the provisioning further comprises associating a mobile identification number ("MIN") with the mobile station.

25. The mobile communications network of claim 15, wherein the temporary routing number serves as a temporary mobile identification number ("MIN") while the mobile station does not have a MIN registered with the mobile communication network.

26. The mobile communications network of claim 15, wherein the one or more mobile communications network elements is further configured to determine whether the captured mobile station identifier corresponds to a mobile station identifier that is already active on the mobile communication network.

* * * * *